United States Patent [19]
Cole et al.

[11] Patent Number: 5,407,035
[45] Date of Patent: Apr. 18, 1995

[54] COMPOSITE DISK BRAKE ROTOR AND METHOD OF MAKING

[75] Inventors: Gerald S. Cole, Franklin; Robert C. McCune, Jr., Birmingham, both of Mich.

[73] Assignee: Ford Motor Company, Dearborn, Mich.

[21] Appl. No.: 203,917

[22] Filed: Mar. 1, 1994

Related U.S. Application Data

[62] Division of Ser. No. 909,844, Jul. 7, 1992.

[51] Int. Cl.[6] ............................................. F16D 65/10
[52] U.S. Cl. .............................................. 188/218 XL
[58] Field of Search ...................... 188/218 XL, 218 R

[56] References Cited

U.S. PATENT DOCUMENTS

| | | | |
|---|---|---|---|
| 4,290,510 | 9/1981 | Warren | 188/218 X L |
| 5,132,278 | 7/1992 | Stevens et al. | 428/614 X |
| 5,194,304 | 3/1993 | McCune, Jr. et al. | 427/449 |

*Primary Examiner*—Robert J. Oberleitner
*Assistant Examiner*—Peter M. Poon
*Attorney, Agent, or Firm*—Joseph W. Malleck; Roger L. May

[57] ABSTRACT

A method of making and the resulting product for a disk brake rotor with a self-lubricating, thermally conductive coating thereon that enhances the friction wear life of a disk brake assembly within which it is used, comprising: (a) controllably toughening at least the outside braking surfaces of a lightweight metal disk brake rotor, said roughening being carried out to promote mechanical adhesion of coatings applied thereover; (b) thermally spraying one or more coatings onto the roughened outside braking surface, the exposed coating being electric arc sprayed using a codeposit of iron-based material and powdered graphite to form an iron matrix composite coating; and (c) surface heat treating essentially the exposed coating to dissolve and precipitate graphite and form a simulated cast iron and also to densify the coating and remove residual stresses resulting from deposition. To inhibit heat transfer, the method may further comprise forming the lightweight metal rotor to have a pair of annular ring walls supported by a hub, the ring walls being separated by a plurality of vanes for inducing air cooling as the rotor rotates, and interposing a thermally sprayed metallic-based heat barrier coating between the rotor and exposed coating. The barrier coating may be comprised of a nickel-based material which preferably includes graphite codeposited therewith. The cooling vanes and intermediate coating cooperate to protect the rotor against extreme heated conditions.

1 Claim, 4 Drawing Sheets

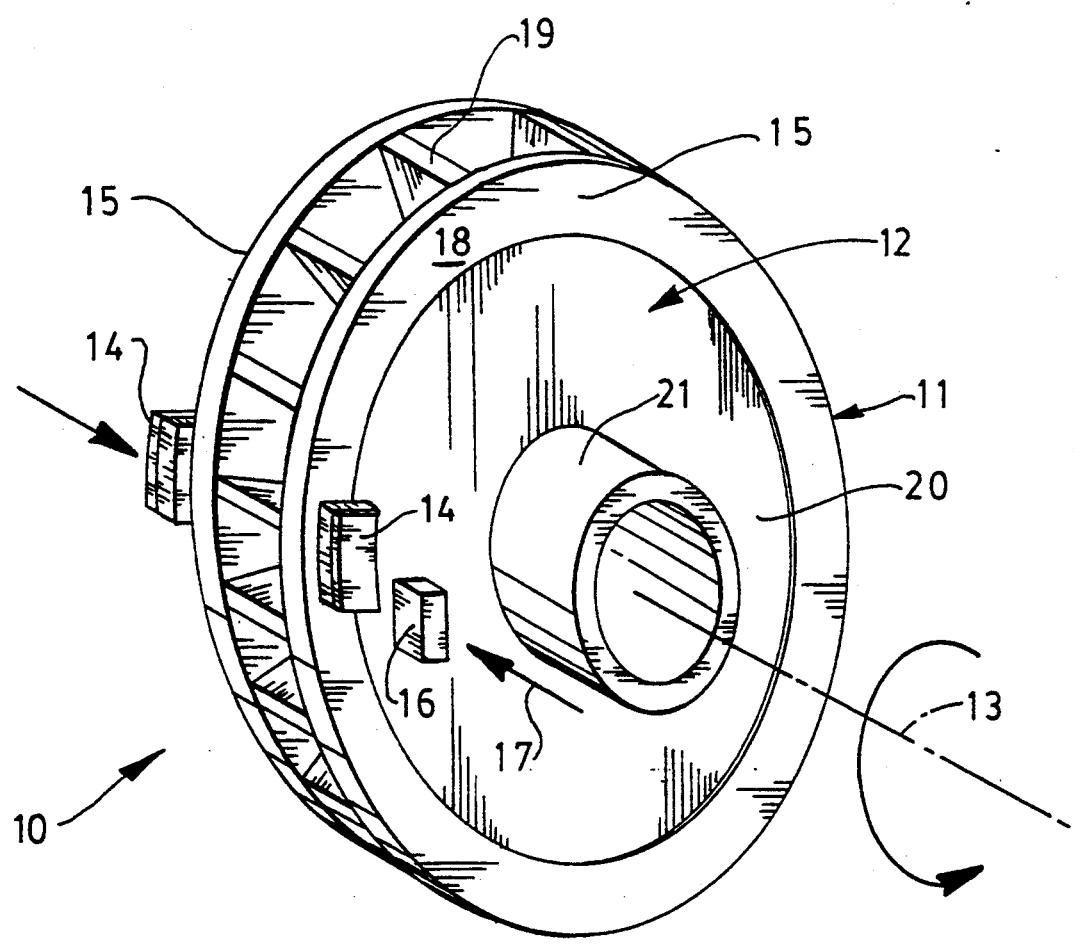

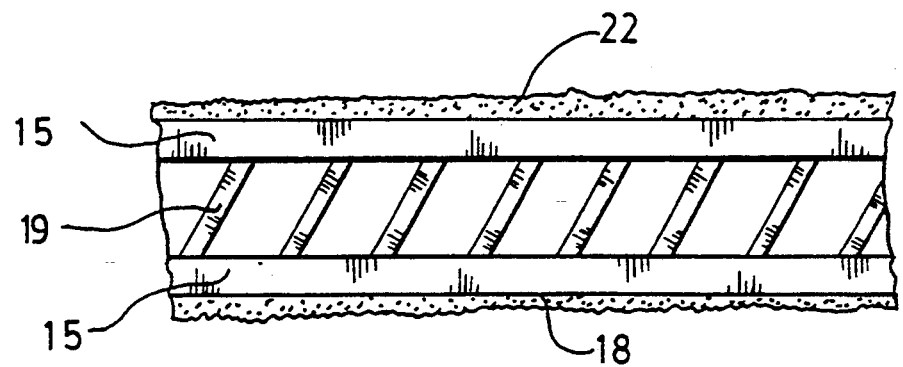
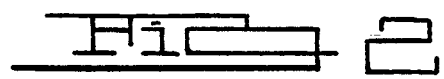
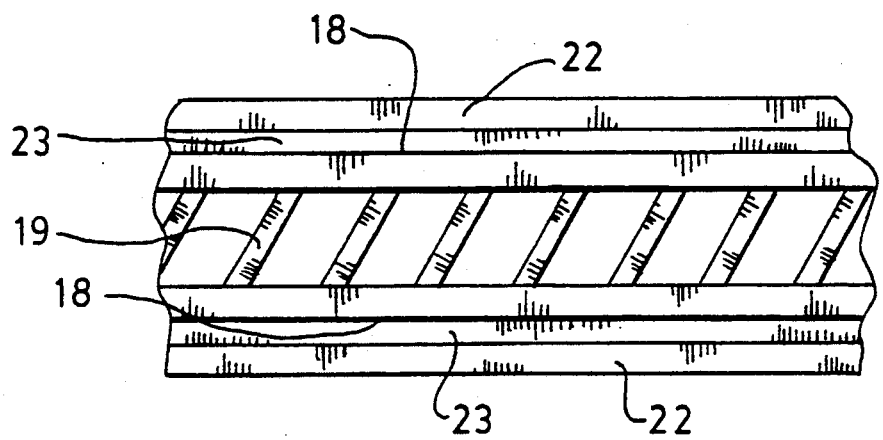
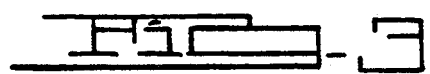

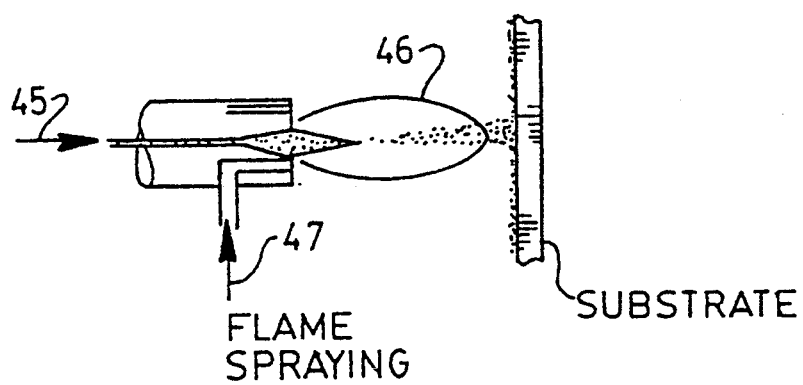
FLAME SPRAYING
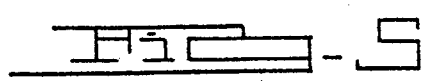
PRIOR ART
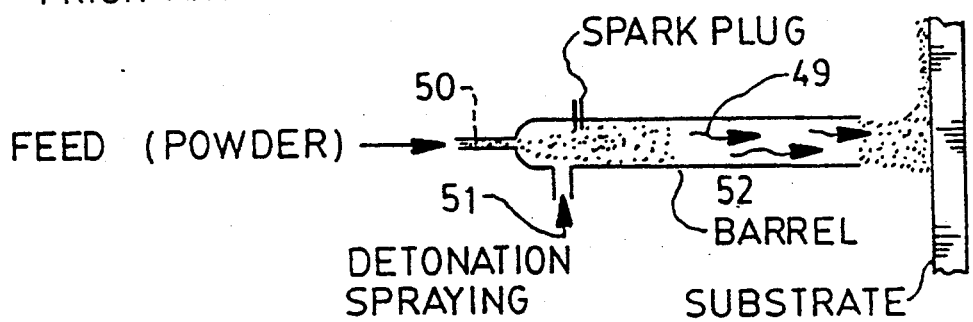
DETONATION SPRAYING
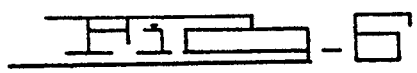
PRIOR ART
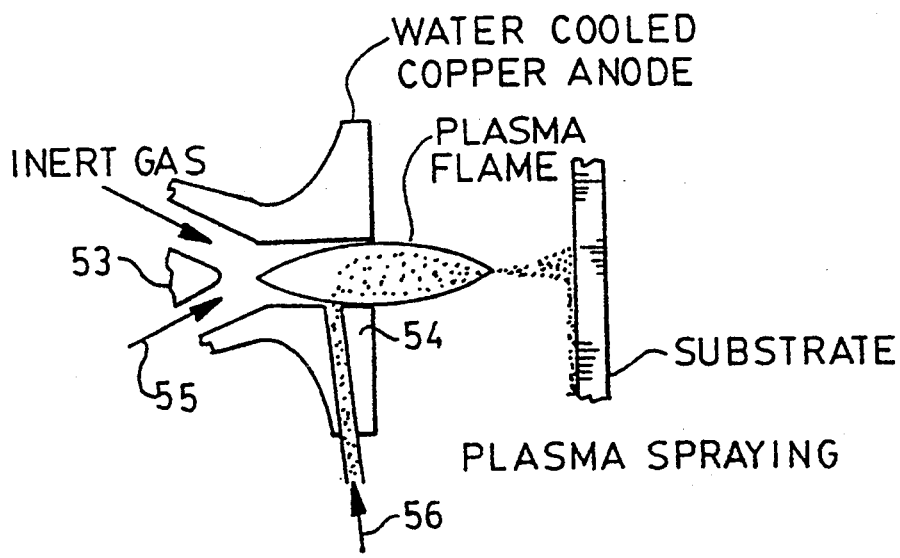
PLASMA SPRAYING
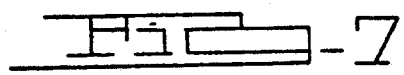
PRIOR ART

COMPOSITE DISK BRAKE ROTOR AND METHOD OF MAKING

This application is a divisional of U.S. Ser. No. 07/909,844, filed Jul. 7, 1992.

BACKGROUND OF THE INVENTION

1. Technical Field

This invention relates to the art of making lightweight disk brake rotors, and more particularly to the technology of enhancing the wear life of the disk brake assembly utilizing such rotor.

2. Discussion of the Prior Art

For weight reduction of vehicles, it is desirable to be able to use lightweight metals, such as aluminum, magnesium, or metal matrix composites using such metals as the matrix, in brake structure applications such as rotors and drums. Unfortunately, aluminum and many of its alloys as well as other lightweight metals, when used as brake drums or rotors, result in unacceptable wear of the braking surface material that is brought to bear against the brake lining or disk brake pads. Such wear often promotes unpredictable braking characteristics. In the case of lightweight or aluminum brake drums, the problem has been addressed by use of preformed grey cast iron liners of substantial thickness of about ¼ inch which are integrally bound to the aluminum or lightweight drum when it is cast (see SAE Paper 710247, "Influence of Rotor Metallurgy on the Wear of Friction Materials in Automotive Brakes", S. K. Rhee, 1971; and SAE Paper 780248, "Aluminum Structural Castings Result in Automobile Weight Reduction", B. E. Hatch et al, 1978).

However, disk brake rotors constructed of aluminum or lightweights materials cannot accept such preforms and have not been introduced commercially because of the poor wear life of the braking surface and because high heat transfer to the lightweight metal causes thermal distortion and other stress problems under certain critical braking conditions. Thus, the issues that remain are essentially threefold: how to (a) provide an outer face for the rotor disk that enhances the wear life of the braking surface which bear against the friction pads; (b) ensure strong bonding of such face with a lightweight metal rotor; (c) provide a rotor construction that inhibits heat transfer of the braking forces heat buildup to the lightweight metal rotor during the most extreme braking conditions.

Metal sprayed coatings or facings applied to heavy metal rotors such as steel provide a more uniform and enhanced coefficient of friction, but do not solve the threefold problem above (see U.S. Pat. No. 4,351,885).

SUMMARY OF THE INVENTION

In a first aspect, the invention is a method of making a disk brake rotor with a self-lubricating coating thereon that enhances the friction wear life of a disk brake assembly within which it is used, comprising: (a) controllably roughening at least the outside of braking surfaces of a lightweight metal disk brake rotor, said roughening being carried out to promote mechanical adhesion of coatings applied thereover; (b) thermally spraying one or more coatings onto said roughened outside braking surface, the exposed coating being electric arc sprayed using a codeposit of iron-based material and powdered graphite to form an iron matrix composite coating; and (c) surface heat treating essentially said exposed coating to precipitate graphite and form a simulated cast iron and also to densify the coating and remove residual stresses resulting from deposition.

To inhibit heat transfer, the method may further comprise forming the lightweight metal rotor to have a pair of annular ring walls supported by a hub, the ring walls being separated by a plurality of vanes for inducing air cooling as the rotor rotates, and interposing a thermally sprayed metallic-based heat barrier coating between said rotor and exposed coating. The barrier coating may be comprised of a nickel-based material which preferably includes graphite codeposited therewith. The cooling vanes and intermediate coating cooperate to protect the rotor against extreme heated conditions.

Another aspect of this invention is the provision of a coated lightweight rotor that enhances the wear life of a disk brake assembly utilizing such rotor, the rotor being characterized by: (a) a lightweight metal body having a pair of annular ring walls separated by a plurality of vanes for inducing cooling as the rotor rotates; (b) one or more coatings mechanically and chemically adhered to the ring walls of said rotor as a result of thermal spraying, the exposed coating being constituted of a simulated cast iron.

BRIEF DESCRIPTION OF THE DRAWINGS

FIG. 1 is a schematic perspective view of a disk brake assembly showing a lightweight rotor possessing coatings on its opposed ring wall faces in conformity with this invention;

FIG. 2 is an enlarged partial sectional view of a portion of the structure of FIG. 1 taken substantially along line 2—2 thereof;

FIG. 3 is a view like FIG. 2 but including a thermal barrier coating;

FIGS. 5–7 are schematic illustrations of prior art techniques for thermal spraying; and FIG. 8 is a tabular listing of comparative characteristics and properties for the thermal spraying techniques of FIGS. 5–7 and 4.

DETAILED DESCRIPTION AND BEST MODE

Figure 4:
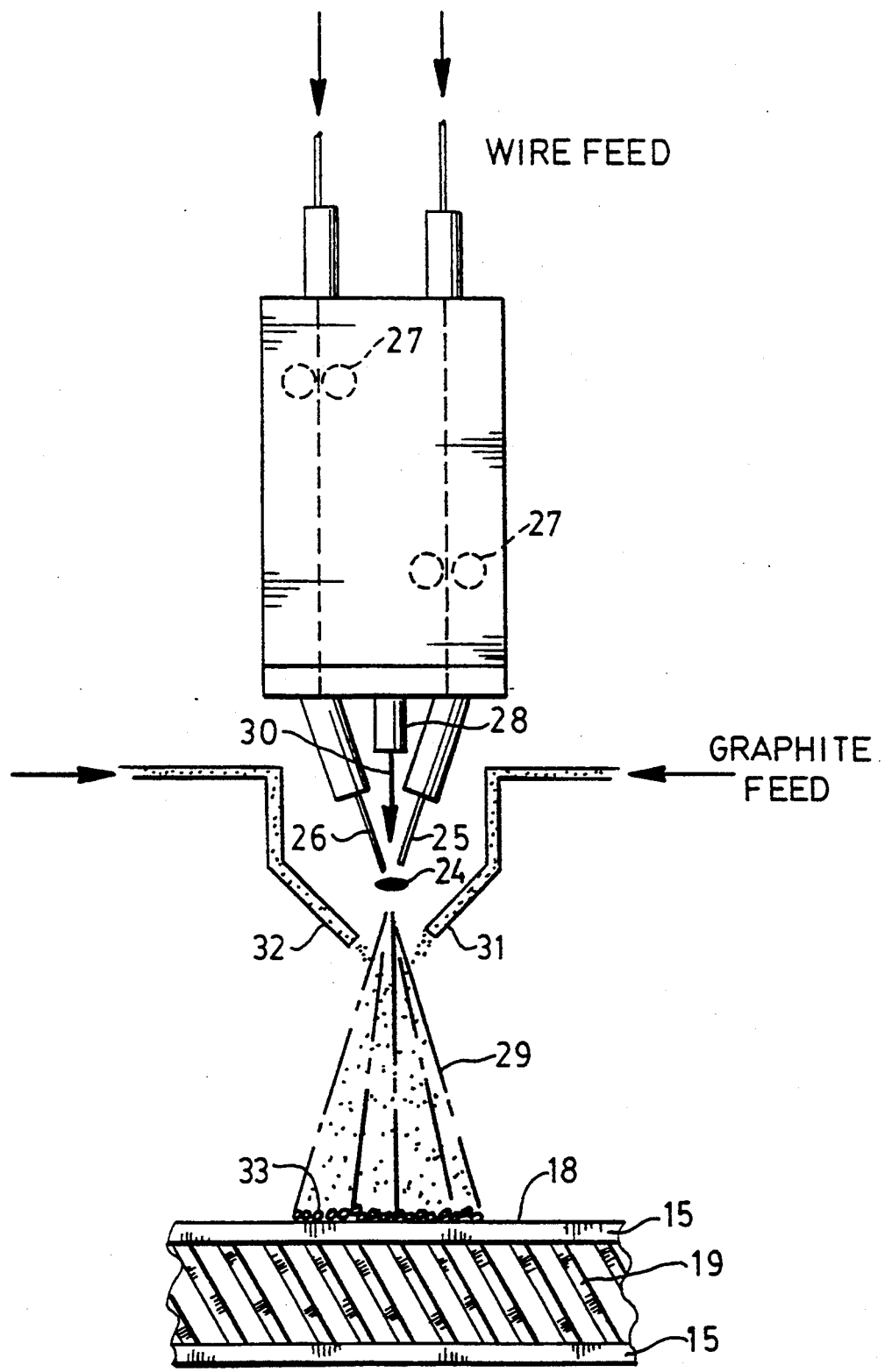
FIG. 4 is a schematic illustration of one technique for carrying out electric arc spraying of an iron-based material and graphite powder to achieve the simulated cast iron coating.

Turning to FIG. 1, a disk brake assembly 10 is shown in which the invention herein has particular utility. The assembly 10 comprises a rotor 11 with a hub assembly 12 mounted for rotation about an axis 13, and at least one friction pad 14 pad to be applied against the ring walls 15 by a stationary caliper or force applying means 16 which moves the pad in a direction 17 to frictionally brake against surface 18.

The rotor is integrally cast of a lightweight metal, preferably an aluminum alloy such as A1356 or an aluminum metal matrix composite containing by weight silicon carbide in the range of 20–30%. The rotor has ring walls 15 facing in opposite axial directions, separated by a plurality of vanes 19 that induce an airflow for cooling the ring walls as the rotor rotates. The vanes and ring walls are supported by an integral solid hub plate 20 and a cylinder sprocket 21 geared to the wheel axle.

The ring wall surfaces 18 are controllably roughened to provide a pattern of asperities that are equivalent to a roughness in the range of 5–40 microinches. Two processes can be used for promoting the mechanical adhesion aspect of the coatings on the rotor. First, a controlled machining or grinding of the ring wall outer surface may be carried out such that a fine saw tooth pattern of machining grooves is produced to yield a surface roughness in the range of 100–1000 microinches for the coating adhesion. Secondly, a process using grid or bead blasting of the parent aluminum-based surface may be used to provide a roughened surface for coating adhesion.

Turning to FIGS. 2 and 3, one or more coatings are applied to the ring walls 15 as thermally sprayed deposits. The outer coating 22 is a simulated cast iron deposited in a thickness range of 1–10 mm. It is mechanically and chemically adhered to the ring wall as a result of the impact of the atomized projected molten iron-based particles along with graphite particles into and against the roughened surface. Upon solidification, a continuous collection of co-mingled particles forms a coating of desired thickness, depending upon the time and temperature of spraying. The outer coating 22 must be surface heat treated to precipitate graphite, thereby more fully simulating a cast iron as well as to densify the coating and remove residual stresses. The density of the coating before the surface heat treatment is 7.1 gms/cm$^3$, and after heat treatment is 6.5–6.9 gms/cm$^3$.

As shown in FIG. 3, an intermediate coating or layer 23 is used either to act as a thermal barrier between the outer coating 22 and the lightweight metal rotor, or to augment the chemical bonding therebetween. To act as a thermal barrier, the intermediate coating 23 may consist of nickel combined with graphite and electric arc sprayed onto the ring wall surfaces 18 to form a coating thickness of 20–30 mm. For augmenting the chemical adhesion qualities of coating 22 thereover, the intermediate coating 23 may consist of an aluminum/cast iron composite or a nickel/graphite aluminum composite (such as Metco 404) delivered to the surface as a plasma sprayed powder coating, or a nickel-based alloy supplied to the surface 18 by a wire-fed arc spray process. The intermediate layer, when it is used to augment the adhesion of the outer coating, should have an ability to form strong bonds with both the lightweight metal-based rotor substrate and the simulated cast iron outer layer 23, and also should have an ability to compensate for the thermal expansion mismatch between the lightweight metal rotor and the cast iron overlayer by having either an intermediate value of expansion coefficient or by plastically deforming in place to make the accommodation.

The method aspect of this invention for making a disk brake rotor with a self-lubricating conductive coating, comprises: (a) controllably roughening the outside braking surfaces of a lightweight metal disk brake rotor constituted of lightweight metal, said rotor having integral cooling vanes separating the outside braking surfaces; (b) thermally spraying one or more coatings onto the roughened braking surfaces, the outermost of said coatings being deposited by electric wire arc spraying of molten iron codeposited with powder graphite to form a simulated cast iron coating; and (c) surface heat treating the outermost coating to dissolve carbon and carbide phases without melting the lightweight metal rotor and further to densify the coating and remove residual stresses therein.

Electric arc thermal spraying uses electrical current to melt the feed material. As shown in FIG. 4, an arc 24 is struck between two consummable wires 25,26 which serve as consummable electrodes (one being an anode and the other a cathode). The wires are advanced by means 27 as they are consumed. The arc melts the wires; compressed air, or an inert gas (such as argon gas), is blown from a nozzle 28 and directed behind the arc 24 along path 30 to cause atomization of the melting metal and project the atomized particles (molten droplets) against the rotor ring walls 15 in a conical spray pattern 29. Graphite powder is forced or injected into the spray cone by injectors 31, 32, downstream of the arc, as shown in FIG. 4. A homogeneous mixture of the iron-based molten particles and the powdered graphite is formed in flight to the rotor. A metal matrix composite coating 33 is formed on the ring walls 15; the coating is a codeposit of iron-based particles and graphite with little interfacial compound formation due to the short solidification time that does not permit the free graphite to become dissolved.

Optimized properties of the as-deposited iron/graphite or alloy composite is developed by post-deposition heat treatment. This improves the wear resistance of the deposit. Most conventional heat treatments require dissolution of carbon or carbide phases at temperatures in excess of about 900° C. in batch furnaces. However, for the process of this invention, only surface heat treatments can be used because of the risk of melting the underlying aluminum. Such surface heat treatments may include: pulsed laser heating, such as disclosed in the article "Development of a Laser Surface Melting Process for Improvement of the Wear Resistance of Grey Cast Iron", A. Blarasin et al, Wear 86, 315–325 (1983); and pulsed arc-lamp heating, such as disclosed in the article "Surface Treatment with a High-Intensity Arc Lamp", Advanced Materials and Processes, Sep. 1990. Such post-deposition heat treatment also acts to densify the coating and remove residual stresses arising from the deposition process.

If a single consummable wire is used, the other electrode will be nonconsummable and is preferably made of tungsten; the air or inert gas is jetted annularly about the nonconsummable electrode to permit the graphite to be added at a variety of zones where the inert gas sheathes, washes, or mixes about the nonconsummable electrode, such as injection at the location of supply of inert gas.

An intermediate coating for such method may be carried out by plasma arc spraying of a nickel or cast iron/aluminum composite, or by electric wire arc spraying of a nickel-based alloy with or without the accompaniment of powder graphite. If the intermediate layer is a nickel-based alloy utilized as a thermal barrier, the deposited thickness should be in the range of 2–3 mm, whereas if used as a chemical bonding enhancer, the thickness of such intermediate layer may be considerably less.

Thermal spraying for the intermediate layer coating can be carried out by any one of four methods of thermal spraying: the combustion-flame process as illustrated in FIG. 5, where the feed 45 is a composition such as described above; the detonation gun process as illustrated in FIG. 6; the arc-plasma spraying process illustrated in FIG. 7; and the electric-arc process illustrated in FIG. 4. Their characteristics and properties, as compared to the electric arc spray process, are shown in the table of FIG. 8.

The combustion-flame process of FIG. 5 may use powders, wires, rods, or cords for the feed material 45 which is fed continuously into an oxygen gas flame 46. If graphite is injected, it is introduced as a separate feed.

Acetylene, propane, or oxygen-hydrogen are commonly adopted fuel gases 47, and temperatures of approximately 3000° C. may be generated after mixing with the oxygen and igniting the flame 46. For the powder-fed system, the velocity of the burning gas flame is sufficient to accelerate the molten particles 48 to speeds over 100 ms$^{-1}$. However, for wire, cord, or rod spraying, compressed air is directed to the molten tip of the feed stock and this atomizes and projects the particles across distances up to one meter.

The detonation gun technique of FIG. 6 is a comparatively recent development and is used primarily to deposit superior quality metallic and ceramic constituents, although its cost limits its widespread application. It utilizes the high energy of rapidly pulsed detonation waves 49 to accelerate powders 50, of a size range 5-60 micrometers, in pulsed ignition of the gas mixture 51. The feed powder is carried in a nitrogen gas stream 52 up to velocities approaching 800 ms$^{-1}$.

The arc-plasma process of FIG. 7 is created by an electric arc struck between a tungsten cathode 53 and a nozzle-shaped copper anode 54 which partially ionizes argon or nitrogen gas 55 passed into the chamber of the spray pistol. By injecting the powders 56 radially or axially into a 20,000° C. plasma flame, particles can reach speeds of about 600 ms$^{-1}$ before impacting onto a target.

A final finishing treatment for the coated rotor comprises machining the outermost coating to form the final shape, but caution should be exercised so that the amounts of material removed be in minimal amounts, such as in the range of 0.020-0.040 inches, so that the simulated cast iron outer layer is not detrimentally affected or removed.

We claim:

1. A coated lightweight metal rotor for enhancing the wear life of a disk brake assembly, comprising:
   (a) a solid disk brake rotor;
   (b) a lightweight metal rotor body having a pair of annular ring walls separated by a plurality of vanes for inducing cooling as the rotor rotates;
   (c) one or more thermally sprayed coatings mechanically and chemically adhered to said ring walls, the exposed coating being constituted of a simulated cast iron and having the following physical and performance characteristics: 6.9-7.1 gm/cc density, 1200°-1300° C. melting temperature, and 150-300 Brinell hardness.

* * * * *